US008021121B2

(12) United States Patent
Mikkelsen et al.

(10) Patent No.: US 8,021,121 B2
(45) Date of Patent: Sep. 20, 2011

(54) WIND TURBINE, A METHOD FOR ESTABLISHING AT LEAST ONE APERTURE IN THE SPINNER OF THE HUB OF A WIND TURBINE ROTOR AND USE OF A WIND TURBINE

(75) Inventors: Per Sveigaard Mikkelsen, Sabro (DK); Carsten Bruun Andersen, Århus V (DK)

(73) Assignee: Vestas Wind Systems A/S, Randers SV (DK)

( * ) Notice: Subject to any disclaimer, the term of this patent is extended or adjusted under 35 U.S.C. 154(b) by 41 days.

(21) Appl. No.: 12/539,982

(22) Filed: Aug. 12, 2009

(65) Prior Publication Data

US 2009/0317257 A1 Dec. 24, 2009

Related U.S. Application Data

(63) Continuation of application No. PCT/DK2007/000385, filed on Aug. 24, 2007.

(30) Foreign Application Priority Data

Feb. 12, 2007 (DK) .................................. 2007 00229

(51) Int. Cl.
*F03D 1/06* (2006.01)
*F03D 11/00* (2006.01)
(52) U.S. Cl. ...................................... 416/245 R; 415/4.3
(58) Field of Classification Search .................. 415/4.3, 415/4.5, 908; 416/245 R; 290/44, 55
See application file for complete search history.

(56) References Cited

U.S. PATENT DOCUMENTS

| 1,427,872 | A * | 9/1922 | Verville ........................... 244/57 |
| 6,285,090 | B1 * | 9/2001 | Brutsaert et al. ................. 290/55 |
| 6,800,956 | B2 * | 10/2004 | Bartlett ........................... 290/55 |

(Continued)

FOREIGN PATENT DOCUMENTS

EP 1669596 A2 6/2006

(Continued)

OTHER PUBLICATIONS

International Search Report and Written Opinion of the International Searching Authority, Mar. 13, 2008 (5 pages).

(Continued)

*Primary Examiner* — Nathaniel Wiehe
(74) *Attorney, Agent, or Firm* — Woods, Herron & Evans, L.L.P.

(57) ABSTRACT

A wind turbine includes a rotor having a hub from which a number of wind turbine blades extend, and a spinner mounted on the hub, wherein the spinner includes one or more apertures. The wind turbine is characterized in that it includes one or more aperture covers for entirely or partly covering one or more of the apertures in the spinner and in that the wind turbine further includes one or more aperture adjustment mechanisms for adjusting the effective size of one or more of the apertures, by displacement of one or more of the aperture covers. A method for establishing at least one aperture in the spinner on the hub of a wind turbine rotor and use of a wind turbine are also contemplated.

34 Claims, 6 Drawing Sheets

U.S. PATENT DOCUMENTS

| | | | |
|---|---|---|---|
| 7,550,863 B2 * | 6/2009 | Versteegh | 290/44 |
| 7,614,850 B2 * | 11/2009 | Rogall | 416/155 |
| 2004/0160063 A1 | 8/2004 | Le Nabour et al. | |
| 2006/0067827 A1 | 3/2006 | Moroz | |
| 2006/0120862 A1 * | 6/2006 | Jannasch et al. | 415/175 |
| 2006/0152014 A1 * | 7/2006 | Grant et al. | 290/55 |
| 2009/0060748 A1 * | 3/2009 | Landa et al. | 416/93 R |
| 2009/0206610 A1 * | 8/2009 | Martin et al. | 290/55 |
| 2010/0045047 A1 * | 2/2010 | Stiesdal | 290/55 |
| 2010/0253086 A1 * | 10/2010 | Song et al. | 290/55 |
| 2010/0290918 A1 * | 11/2010 | Pedersen | 416/245 R |

FOREIGN PATENT DOCUMENTS

| | | |
|---|---|---|
| WO | 2004106732 A1 | 12/2004 |

OTHER PUBLICATIONS

International Preliminary Report on Patentability, Jul. 3, 2009 (6 pages).

* cited by examiner

WIND TURBINE, A METHOD FOR ESTABLISHING AT LEAST ONE APERTURE IN THE SPINNER OF THE HUB OF A WIND TURBINE ROTOR AND USE OF A WIND TURBINE

CROSS-REFERENCE TO RELATED APPLICATIONS

The present application is a continuation of pending International patent application PCT/DK2007/000385 filed on Aug. 24, 2007 which designates the United States and claims priority from Danish patent application PA 2007 00229 filed on Feb. 12, 2007, the content of which is incorporated herein by reference.

FIELD OF THE INVENTION

The invention relates to a wind turbine comprising a rotor including a hub from which a number of wind turbine blades extend, and a spinner mounted on said hub, wherein said spinner comprises one or more apertures and a method for establishing at least one aperture in the spinner on the hub of a wind turbine rotor and use of a wind turbine.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

As large modern wind turbines gets bigger and bigger in power output the different equipment inside the wind turbine also gets bigger and more complex and the challenge of ensuring accessibility to the different areas of the inside of the wind turbine becomes more pronounced.

Accessibility is important both to ensure that air (e.g. for cooling purposes), spare parts, personnel and/or other can get into and/or out of the wind turbine or specific areas of the wind turbine.

From American patent application US 2006/0120862 A1 it is known to provide the spinner on a wind turbine rotor hub with an air inlet and an air outlet. However the openings are very inflexible and they are substantially only suited for access of air.

An object of the invention is therefore to provide for an advantageous technique for ensuring accessibility of a wind turbine.

SUMMARY OF THE INVENTION

The invention provides for a wind turbine comprising a rotor. The rotor includes a hub from which a number of wind turbine blades extend, and a spinner mounted on the hub, wherein the spinner comprises one or more apertures. The wind turbine is characterized in that it comprises one or more aperture covers for entirely or partly covering one or more of the apertures in the spinner and in that the wind turbine further comprises one or more aperture adjustment means for adjusting the effective size of one or more of the apertures, by movement of one or more of the aperture covers.

The hub of the rotor has to be able to transfer the massive load from the blades to the nacelle and any kind of aperture in the hub construction would therefore weaken the hub. The spinner on the other hand substantially only has to be able to cope with gravity, small centrifugal forces and wind load. These load are relatively modest making the spinner an advantageous part of the wind turbine to place apertures.

The hub and spinner is in most modern wind turbines a confined space comprising complex mechanical and electrical equipment e.g. the pitch mechanism for turning the blades around their longitudinal axis, teeter mechanism, lightning protection systems or other kinds of equipment and it is therefore sometimes necessary to gain access to the hub and/or spinner to do maintenance or repairs or even to replace defective components.

Legislations regarding evacuation from confined spaces dictate a requirement for a quick and easy operated escape route for personnel and most often the passage from the nacelle to the hub can be difficult to pass and it is therefore advantageous to provide the spinner with an aperture.

Furthermore, if air e.g. for cooling equipment in the rotor, is taken in at the spinner in the front of the rotor (and in the front of the wind turbine in general) and let out at the back of the rotor or at the back of the wind turbine, substantially no means for creating the air flow would be need, in that the air flows through the rotor and/or other parts of the wind turbine in the same direction as the surrounding wind. The cooling capacity of the air flow taken in through the apertures in the spinner could then be controlled by controlling the effective size of the apertures, by adjusting the position of aperture covers.

It should be emphasized that by the term "effective size of ... the apertures" is to be understood the part of the aperture in the spinner that allows substantially free passage through the aperture i.e. the effective size of the aperture is the size of the aperture in the spinner minus the area of the aperture being covered by the aperture cover.

In an aspect of the invention said one or more aperture adjustment means comprises one or more moving means for adjusting the position of said one or more aperture covers in relation to said spinner to adjust the effective size of said one or more apertures.

If the aperture is to be used as emergency exit, entrance hatch for goods or even if they are only to be used as air intake they have to be of considerable size and since the wind load is very significant on the spinner it is advantageous to further provide the wind turbine with moving means for adjusting or at least aiding in adjusting the position of the aperture covers.

In an aspect of the invention said moving means for adjusting the position of said one or more aperture covers comprises means for being manually operated e.g. by means of a manually operated actuator.

The spinner is a rather remote part of the wind turbine and it could be expensive and/or complicated to provide electricity, hydraulic pressure or other to enable that the moving means could be operated automatically or semi-automatically.

Furthermore if the aperture is also to be used as an emergency exit it is possible that in such an emergency the electrical or hydraulically system would break down and it is therefore advantageous that the aperture cover comprises means for being manually operated at least as a supplement.

In an aspect of the invention said moving means for adjusting the position of said one or more aperture covers comprises one or more linear actuators such as pneumatic or hydraulic cylinders or based on a rack-and-pinion or motor driven spindle principle.

The spinner of the rotor can be difficult to access and it is therefore important that any equipment placed in the spinner is reliable and substantially maintenance free. Linear actuators are simple and durable means for enabling motion of the covers and it is therefore advantageous to use linear actuators for this purpose.

Furthermore, the wind load on the spinner and the aperture covers can be very big and it might take more force than it is possible to provide manually to open and/or close the aperture and it is therefore advantageous that the moving means comprise mechanically and/or electrically powered means for displacing the covers.

In an aspect of the invention said moving means are operable from the exterior of the spinner and/or the hub.

If it is not possible for personnel to gain access to the hub and spinner from the nacelle, it is advantageous that the moving means can be operated from the outside of the spinner and even if such a passage is available it still could be advantageous in emergency situations (e.g. fire in the nacelle, unconscious personnel in the spinner/hub or other) to be able to open the apertures in the spinner from the outside.

In an aspect of the invention said aperture adjustment means comprises guiding means for guiding said aperture covers at least during said movement of said aperture covers.

The aperture covers are subjected to many different loads (wind, gravity, centrifugal forces etc.) and it is therefore advantageous to provide the wind turbine with guiding means for guiding the aperture covers to ensure that the covers are correctly positioned at all times or at least during the movement of the aperture covers.

In an aspect of the invention said guiding means comprises means for linear displacement of said aperture covers.

As previously mentioned it is important that any equipment placed in the spinner is reliable and substantially maintenance free and since guiding means for linear displacement is simple and reliable, these means are very well suited for use in the spinner.

In an aspect of the invention said one or more apertures are located substantially on the sides of said spinner.

The side of the spinner constitutes a very large area on a large modern wind turbine and since the spinner is only subject to relatively little strain, the side of the spinner is an advantageous location for large apertures suitable as emergency exit, access opening for goods being hoisted in or out of the rotor or other.

Furthermore by placing the apertures in the side of the spinner it is possible to stop the rotor with the aperture substantially facing the underlying ground which is advantageous when personnel, goods or other have to be hoisted in or out of the spinner.

The surface of a spinner on a large modern wind turbine is often designed in a complex curving shape and it can therefore be difficult to determine what is the side and what is the tip of the spinner if the transition is gradual. However a rule of thumb would be that the side is the part of the spinner that is more parallel with the direction of the incoming wind that with the rotor plane and the tip is the part of the spinner that is more parallel with the rotor plane than with the direction of the incoming wind.

In an aspect of the invention the number of apertures in said spinner corresponds with the number of blades of said rotor.

Hereby is achieved a strain-wise advantageous embodiment of the invention.

In an aspect of the invention said apertures are evenly spaced around said spinner and wherein said apertures are located between said blades in relation a rotational plane of said rotor.

By spacing the apertures evenly around the spinner and locating them between the angular positions of the blades in relation to the rotor plane, it is possible to ensure that when an aperture is facing downwards the blades will not impede the vertical transport of goods or other in and out of the aperture and the risk of hoisted goods or other colliding with the blades are highly reduced.

In an aspect of the invention said aperture covers are interconnected or formed as one single part.

Forming all the aperture covers as one single part or by interconnecting them so that they in practise acts as one single part is advantageous, in that only one moving mean is necessary to adjust the efficient size of all the apertures in one operation, the number of guiding means can be reduced and/or the construction can be made simpler.

Furthermore, forming all the aperture covers as one single part provides for simple means for enabling that the efficient size of all the apertures can be adjusted equally when the aperture adjustment means displaces the aperture cover.

In an aspect of the invention the effective size of all of said apertures are adjusted equally when said aperture adjustment means displaces said aperture cover.

Adjusting the effective size of all of the apertures equally when the aperture adjustment means displaces the aperture cover is advantageous in that hereby is enabled a more uniform air intake i.e. the strain of the wind turbine is reduced.

In an aspect of the invention said aperture covers comprises cover apertures substantially corresponding to said apertures in said spinner.

Hereby is achieved an advantageous embodiment of the invention.

In an aspect of the invention said aperture adjustment means comprises means for rotating said aperture covers in a plane substantially perpendicular to the axis of rotation of said spinner.

Displacing the aperture cover by rotating it along the surface of the spinner is advantageous, in that this type of displacement is substantially load neutral to the incoming wind. If the covers where to open outward or inwards the pressure of the incoming wind would have to be overcome at least one way and in consequence the aperture adjustment means would have to be designed to cope with much greater forces.

In an aspect of the invention said guiding means comprises means for guiding said aperture covers along the inside or the outside surface of the sides of said spinner.

By guiding the aperture covers along the inside or the outside surface of the sides of the spinner it is in a simple and efficient way ensured that the efficient size of the apertures can be controlled relatively precisely and it is relatively simple to ensure that the aperture do not take in air along edges where this is not wanted, in that it is fairly simple to seal the edges when the cover maintains a substantially constant distance to the surface of the spinner at all times.

In an aspect of the invention said one or more apertures are located in the tip of said spinner.

The tip if the spinner is the part of the spinner that is furthest away from the blades and the rest of the wind turbine at least in the horizontal plane and when hoisting goods, personnel in or out of such an aperture the risk of hoisted goods etc. colliding with the rest of the wind turbine is reduced.

Furthermore the tip of the spinner is a central and symmetrically position which can enable a more advantageous air intake and a less stress inducing design.

In an aspect of the invention said guiding means comprises at least one helix for transforming rotation of said guiding means or said aperture covers into linear displacement of said aperture covers.

Rotation is an easy and simple motion to gear and to provided either mechanically (e.g. motor driven) or by hand and it is therefore advantageous to make the guiding means comprises a helix.

In an aspect of the invention said aperture adjustment means comprises means for displacing said aperture covers substantially along the axis of rotation of said rotor.

Opening the cover by pushing it forward into the incoming wind along the axis of rotation is advantageous, in that more load/strain optimal aperture adjustment means are hereby provided and in that a more evenly distributed air flow is provided.

In an aspect of the invention said one or more apertures in said spinner are circular.

Circular holes have no sharp edges in which stress can be concentrated and it is therefore advantageous to form the apertures in the spinner as circular holes.

In an aspect of the invention said aperture cover has an outer diameter and wherein said outer diameter is bigger than the inner diameter of said aperture in said spinner.

By making the aperture cover bigger than the aperture it is covering, the cover will create an overlap zone along the entire rim of the aperture, hereby enabling then the path of taken in air becomes more complex and as a consequence increasing the chance of unwanted foreign object such as dirt, rain drops, bugs or other being hurled out of the taken in air before it enters the spinner.

Furthermore a overlap zone around the entire edge of the aperture also ensures that it is relatively easy to seal the aperture properly when it is closed, in that the overlap zone enables plenty of room for providing sealing means.

In an aspect of the invention at least one of said one or more apertures in said spinner is a through-going aperture allowing passage for personnel and/or goods from the interior of said spinner to the exterior of said spinner and vice versa.

Hereby is achieved an advantageous embodiment of the invention.

The invention further provides for a method for establishing at least one aperture in the spinner on the hub of a wind turbine rotor, said aperture being established by displacing an aperture cover for partly or entirely covering said aperture.

Providing the spinner of a wind turbine with an aperture is advantageous in that safety, load/tension and air flow wise the spinner is an advantageous place to position apertures and by providing the apertures with displaceable covers it is possible to adjust the efficient size of the apertures.

In an aspect of the invention the position of said aperture cover is adjusted in relation to said spinner to adjust the effective size of said aperture.

In an aspect of the invention said aperture cover is displaced manually.

In an aspect of the invention said aperture cover is displaced by means of mechanical force e.g. performed by motor driven gears, pneumatic or hydraulic cylinders, motor driven rack-and-pinion or motor driven spindle.

In an aspect of the invention said aperture cover can be displaced from the exterior of said spinner and/or wherein means for displacing said aperture cover is operable from the exterior of the spinner.

In an aspect of the invention said aperture cover is guided by guiding means at least during said displacement of said aperture covers.

In an aspect of the invention said aperture cover is displaced linearly.

In an aspect of the invention said aperture cover is displaced by being rotated substantially around the axis of rotation of said spinner.

In an aspect of the invention said at least one aperture is provided in the side of said spinner.

In an aspect of the invention said at least one aperture is provided in the tip of said spinner.

In an aspect of the invention said spinner comprises at least two apertures and wherein the effective size of all of said apertures are adjusted equally when at least one aperture cover is displaced.

In an aspect of the invention said aperture cover is guided along the inside or the outside surface of the sides of said spinner.

In an aspect of the invention said at least one aperture is an emergency exit of said wind turbine.

Legislations regarding evacuation from confined spaces dictate a requirement for a quick and easy operated escape route for personnel and most often the passage from the nacelle to the hub can be difficult or impossible to pass and it is therefore advantageous to use the aperture in the spinner as an emergency exit of the wind turbine.

Even further the invention provides for use of a wind turbine in relation with a method wherein said wind turbine is a Megawatt wind turbine.

In smaller wind turbines it is not possible to stay in the hub and the spinner and there are therefore no need for emergency exits is the hub or spinner in such wind turbines. However in large modern wind turbines with a nominal rated power of more than one Megawatt the hub and spinner is so big that it is possible and necessary to do repairs and maintenance inside the hub and spinner and it is therefore especially advantageous that it is possible to use an aperture in the spinner to gain access or at least to be used as emergency exit.

BRIEF DESCRIPTION OF THE DRAWINGS

The invention will be described in the following with reference to the figures in which.

DETAILED DESCRIPTION OF THE INVENTION

Figure 1:
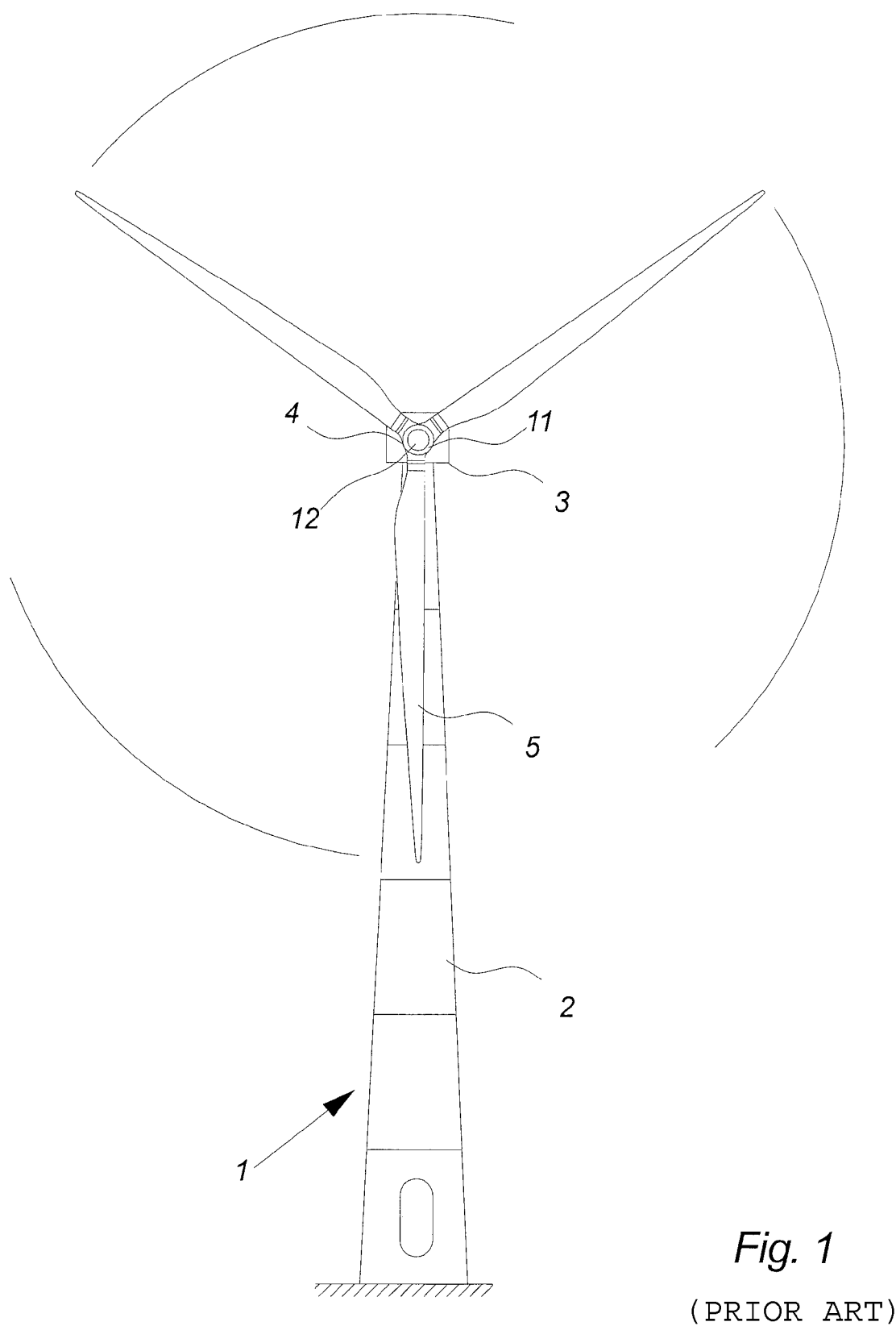
FIG. 1 illustrates a large modern wind turbine known in the art, as seen from the front.

FIG. 1 illustrates a modern wind turbine 1, comprising a tower 2 placed on a foundation and a wind turbine nacelle 3 positioned on top of the tower 2. The wind turbine rotor 4 comprises three wind turbine blades 5 extending from and connected to a common hub 11. The front side of the hub 11 is provided with a spinner 12 and the rotor 4 is in this embodiment connected to the nacelle 3 through a low speed shaft which extends out of the nacelle 3 front.

Figure 2:
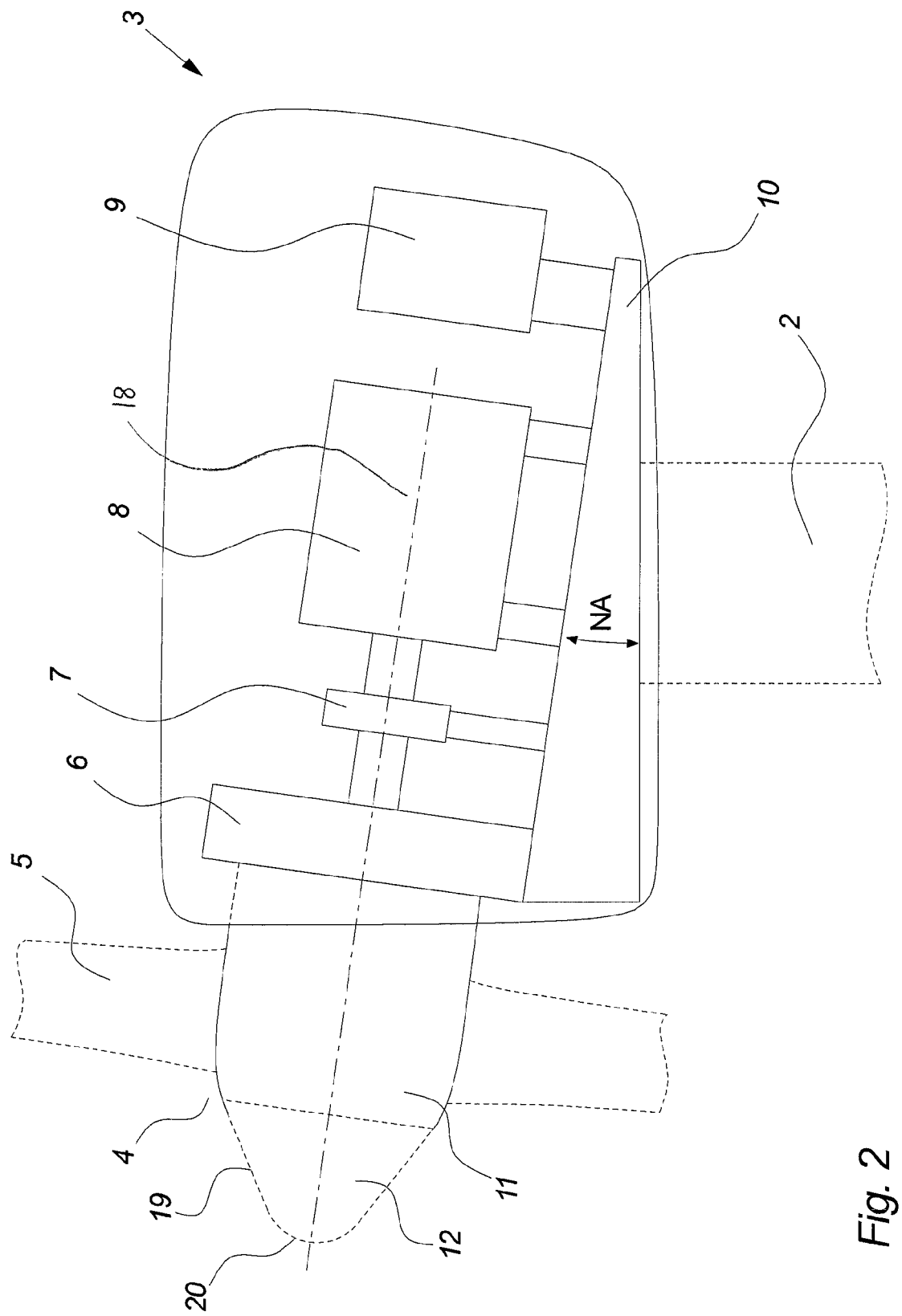
FIG. 2 illustrates a simplified cross section of a nacelle, as seen from the side.

FIG. 2 illustrates a simplified cross section of a nacelle 3, seen from the side.

Nacelles 3 exists in a multitude of variations and configurations but in most cases the drive train in the nacelle 3 almost always comprise one or more of the following components: a gear 6, a coupling (not shown), some sort of breaking system 7 and a generator 8. A nacelle 3 of a modern wind turbine 1 can also include a converter 9, an inverter (not shown) and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in form of a bed frame to which some or all the components 6, 7, 8, 9 are connected. In another embodiment the load carrying structure 10 could comprise a gear bell transferring the load of the rotor 4 to the tower 2 and/or the load carrying structure 10 could comprise several interconnected parts such as latticework 13.

In this embodiment of the invention the drive train is established in a normal operation angle NA of 8° in relation to a plane perpendicular to the tower 2, a centre axis through the tower 2 and a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

The hub 11 is in the direction of the incoming wind provided with a spinner 12 in the form of an aerodynamic cone rigidly connected to the hub 11 and therefore revolving with the hub 11 and the rest of the rotor 4. It is off cause advantageous that the spinner 12 is formed in an aerodynamic shape, such as cone shaped, conical, frustum of a cone, many-sided pyramid, hemisphere or other, to guide the incoming wind around the hub 11 and thereby reduce the wind load on the wind turbine 1. However, it is also feasible that the spinner 12 for other reasons could be shaped in a not so aerodynamic shape such as more flat nosed or other.

In this embodiment the spinner 12 is a shell made from fibreglass reinforced resin but in another embodiment the spinner 12 could be formed as a conical sheet metal fairing. It is also feasible that the spinner 12 could be made from another material such as plastic, wood or other or that it was formed differently than a shell such as solid, semi-solid or with varying material thickness.

In this embodiment the spinner 12 is not provided with apertures 13 of any kind but in another embodiment the spinner could be provided with one or more apertures 13 of any shape such as round, square, rectangular, oval or a the aperture could be formed in more complex shape such as by a more or less complex curve, polygonal or other.

Likewise, the apertures 13 could be placed anywhere on the spinner 12 i.e. on the side 19 of the spinner 12 or at or near the tip 20 of the spinner 12.

Figure 3:
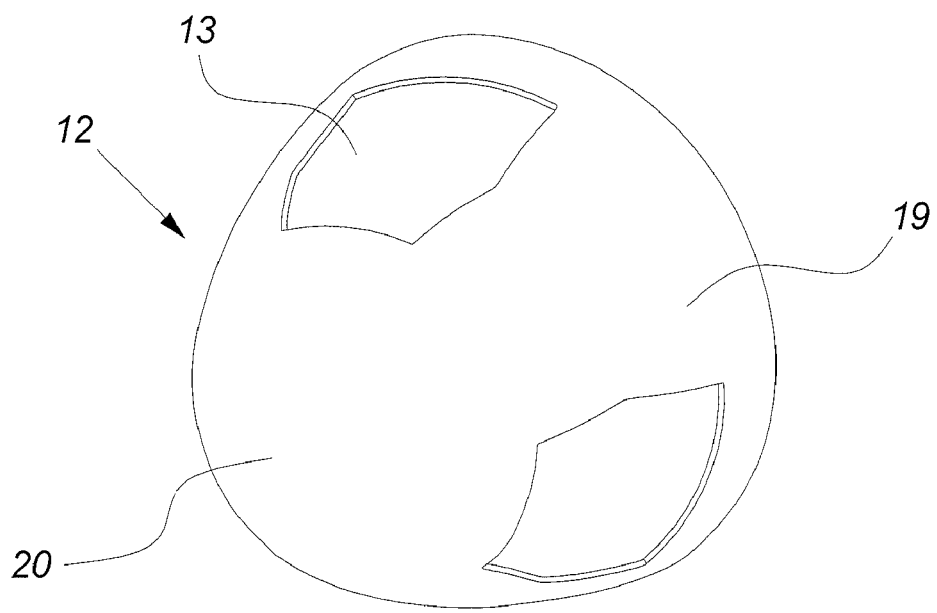
FIG. 3 illustrates a spinner comprising three apertures, as seen in perspective.

FIG. 3 illustrates a spinner 12 comprising three apertures 13, as seen in perspective.

In this embodiment the wind turbine spinner 12 is provided with three evenly spaced apertures 13 placed on the side 19 of the spinner 12. The apertures 13 substantially have the shape of rectangles where the end towards the tip 20 of the spinner 12 inclines making the rectangles cone slightly towards the tip 20.

In this embodiment the apertures 13 are through-going meaning that the apertures 13 are formed as holes or openings extending from the outside surface of the spinner 12 to the inside surface of the spinner 12 i.e. enabling free passage for e.g. air, goods, personnel or other from the exterior of the spinner 12 to the interior of the spinner 12 and vice versa.

In another embodiment only parts of the apertures 13 could be through-going.

Figure 4:
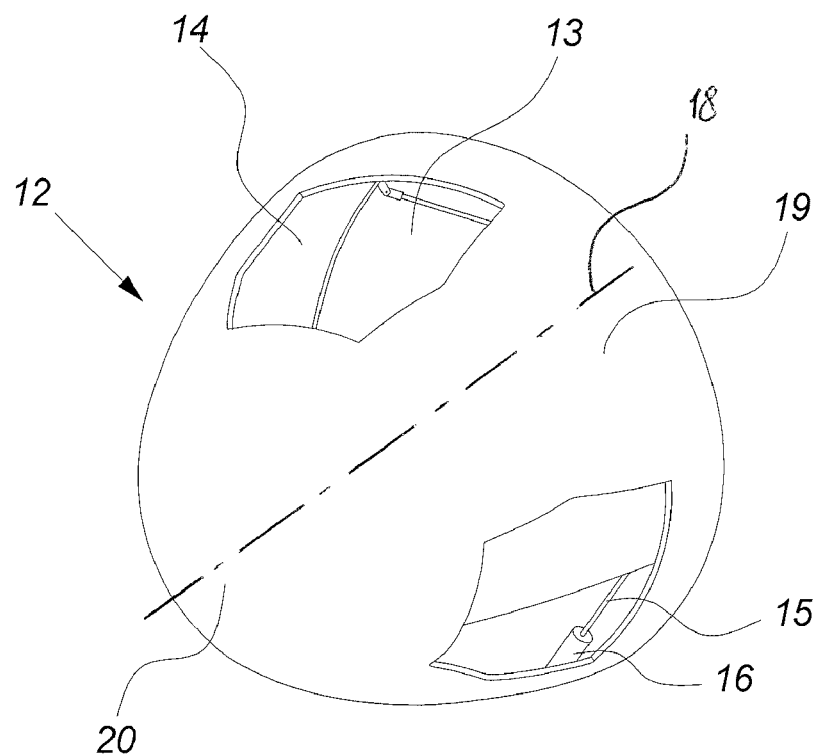
FIG. 4 illustrates a spinner comprising three apertures with aperture covers, as seen in perspective.

FIG. 4 illustrates a spinner 12 comprising three apertures 13 with aperture covers 14, as seen in perspective.

In this embodiment of the invention the three apertures 13 are each provided with an aperture cover 14 formed as a plate of a shape substantially corresponding to the shape of the aperture 13 in the spinner 12 and of a size slightly bigger than the aperture 13, hereby enabling that if the cover 14 is placed directly over the corresponding aperture 13 in the spinner 12 the entire aperture 13 is covered by the cover 14.

In this specific embodiment the covers 14 are displaced on the inside of the spinner 12 but in another embodiment they could also be displaced on the outside of the spinner 12, in and out of a dedicated pocket of the spinner 12, between different layers of the spinner 12 or other.

In this embodiment the three covers 14 are placed in a position where they each cover substantially half of their respective apertures 13 but in another embodiment they could be placed differently e.g. leaving the aperture 13 almost completely open or almost or completely closed or other or the effective size of the aperture 13 could vary more or less constantly e.g. in accordance with the need for air for cooling purposes or other.

In this embodiment the covers 14 are placed in identical positions in relation to their respective apertures 13 but in another embodiment each cover 14 could be positioned differently from the other covers 14, the covers 14 could be divided into groups where each group would be set uniformly or other.

In this embodiment the spinner 12 is further provided with aperture adjustment means 15 at each aperture 13. The aperture adjustment means 15 comprises moving means 16 for individually adjusting the position of each the aperture covers 14.

In this embodiment the moving means 16 are linear actuators in the form of hydraulic cylinders but in another embodiment the moving means 16 could comprise pneumatic cylinders or the moving means 16 could be based on a rack-and-pinion or motor driven spindle principle or the covers 14 could simply be manually operated i.e. the position of the covers could be adjusted by hand e.g. with the aid of some sort of mechanical gearing.

In this embodiment of the invention the aperture adjustment means 15 further comprises guiding means 17 in the form of guiding rails (not shown) extending along the sides of the covers 14 in the direction of travel, hereby ensuring that the covers 14 are guided closely along the inside surface of the spinner 12 to ensure that the spinner 12 is substantially sealed against dust, water and other over the area covered by the aperture covers 14. The covers 14 or the spinner 12 could further comprise some sort of sealing device e.g. along the edges of the aperture 13, to further aid in preventing unwanted foreign objects from entering the spinner 12.

In this embodiment the moving means 16 ensures that a given position of the cover 14 is maintained for as long as desired but in another embodiment the covers 14 or the spinner 12 could comprise some sort of locking mechanism for fixating the cover 14 in a given position. The locking mechanism could engaged and disengaged manually or it could comprise mechanical and/or electrical means for automatically or semi-automatically operation.

In this embodiment the moving means 16 are operable from the exterior of the spinner 12 in that the inside of the bottom the tower 2 is provided with a button, which when activated in one direction will initiate motion of all the covers 14 in one direction and when activated in the other direction will initiate motion of all the covers 14 in the other direction.

In another embodiment the position of the covers 14 could be adjusted individually, the means for operating could be placed elsewhere such as on the outside of the tower 2, the nacelle 3, the hub 11 or on the outside of the spinner 12, the operating means could be placed inside the nacelle 3 or the hub 11, the operating means could be placed directly on or close to the moving means 16 in the hub 11 or inside the spinner 12 or the position or the covers 14 could be controlled by means of a remote control.

Figure 5:
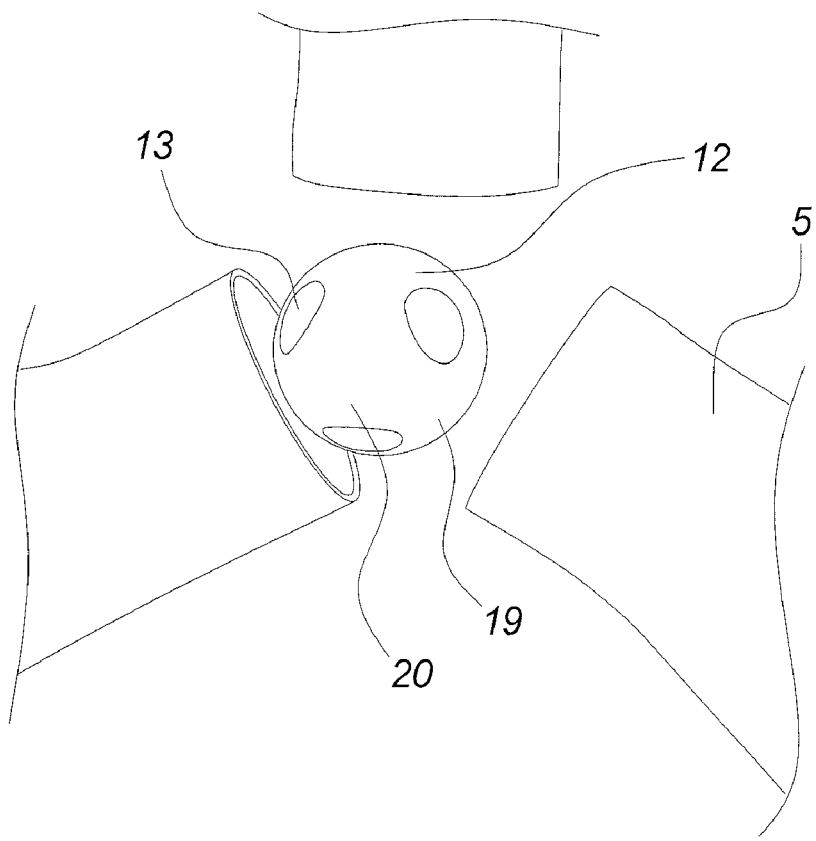
FIG. 5 illustrates a wind turbine rotor without hub, as seen in perspective.

FIG. 5 illustrates a wind turbine rotor 4 without hub 11, as seen in perspective.

In this embodiment of the invention the spinner 12 is provided with three evenly spaced substantially round apertures 13 placed on the side 19 of the spinner 12, making the number of apertures 13 in the spinner 12 correspond exactly with the number of blades 5 on the rotor 4. The apertures 13 are placed substantially in the middle between the blades 5 in relation to the angular position of the blades 5 in the rotor plane, to enable free passage of personnel or goods being hoisted up and down from the aperture 13 facing the underlying ground i.e. the risk of personnel or goods colliding with the blades 5 are highly reduced. However in another embodiment it is feasible that the apertures 13 are positioned differently in relation to the blades 5 e.g. due to the fact that the rotor plane is angled making a downward pointing blade 5 point slightly forward (in the direction of the incoming wind during normal operation of the wind turbine 1). An aperture 13 aligned with the downward pointing blade 5 would therefore enable that the blade 5 could be used e.g. to prevent oscillations of the hoisted load.

Figure 6:
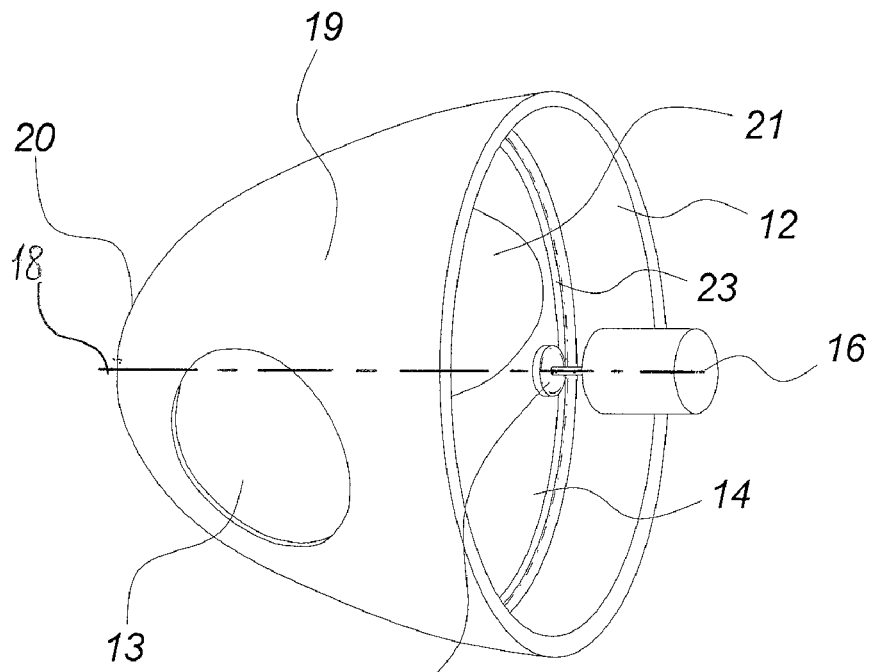
FIG. 6 illustrates a spinner comprising three apertures and an aperture cover comprising three aperture covers, as seen in perspective.

FIG. 6 illustrates a spinner 12 comprising three apertures 13 and an aperture cover 14 comprising three cover apertures 21, as seen in perspective.

In this embodiment of the invention the spinner 12 is also provided with three evenly spaced substantially round apertures 13 placed on the side 19 of the spinner 12. On the inside the spinner 12 is provided with an aperture cover 14 formed as one single part comprising three cover apertures 21, substantially corresponding to the apertures 13 in the spinner 12 both in size and mutual positioning.

The effective size of the apertures 13 in the spinner 12 is adjusted by rotating the cover part 14 hereby adjusting the overlap between the apertures 13 in the spinner 12 and the cover apertures 21 all at once.

In this embodiment the spinner 12 is further provided with aperture adjustment means 15 comprising moving means 16 in the form of an electrical motor, which by means of a gear wheel 22 and an internal gear rim 23 on the inside surface of the cover part 14 can rotate the cover part 14 in relation to the spinner 12 around the centre axis of the spinner 12 i.e. the axis of rotation 18 of the rotor 4.

In this embodiment of the invention the aperture adjustment means 15 further comprises guiding means 17 in the form of two guiding rails (not shown) placed between the cover part 14 and the spinner 12 to ensure constant distance between the two parts 12, 14 and to reduce friction. In another embodiment the guiding means 17 could simply be friction reducing pads or strings between the cover part 14 and the spinner 12 making the coning shape of both parts 12, 14 ensure correct mutual position.

Figure 7:
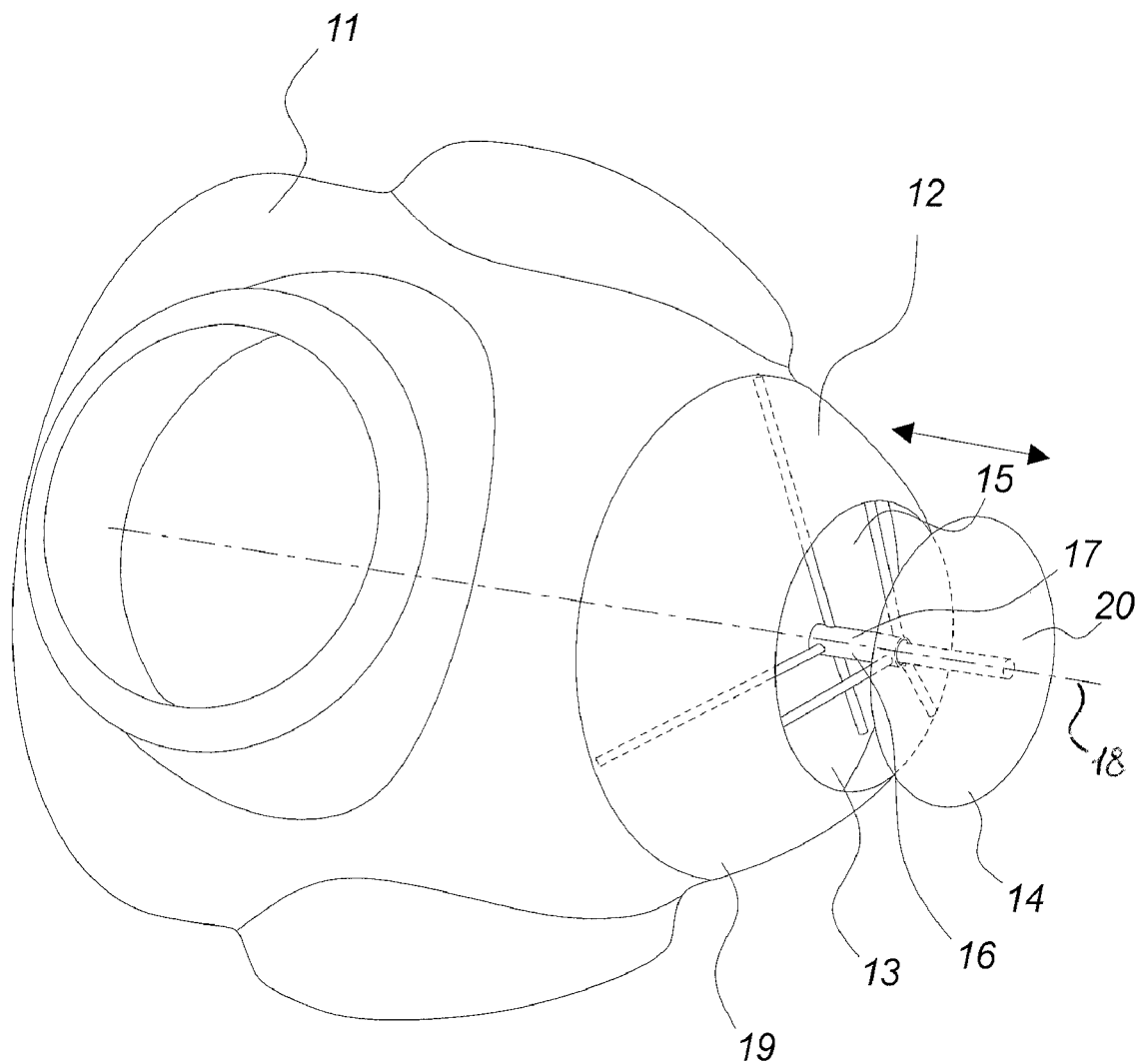
FIG. 7 illustrates a wind turbine hub and spinner with an aperture at the tip of the spinner, as seen in perspective.

FIG. 7 illustrates a wind turbine hub 11 and spinner 12 with an aperture 13 at the tip 20 of the spinner 12, as seen in perspective.

In this embodiment of the invention the spinner 12 is provided with one aperture 13 at the tip 20 of the spinner 12 making the aperture cover 14 form the tip 20 of the spinner 12.

In this embodiment the spinner 12 is provided with aperture adjustment means 15 comprising moving means 16 for displacing the aperture cover 14 directly forward into the incoming wind substantially along the axis of rotation 18 of the rotor 4. In another embodiment the aperture adjustment means 15 could enable that the aperture cover 14 was displaced transversely or the cover 14 could be hinges to the spinner 12 at one side making the cover 14 open and close substantially as an ordinary door.

In this embodiment of the invention the aperture adjustment means 15 or at least the guiding means 17 of the aperture adjustment means 15 are anchored to the inside surface of the spinner 12 but in another embodiment the aperture adjustment means 15 or parts of the aperture adjustment means 15 such as guiding means 17, moving means or other, could be connected directly to the hub 11 or parts in the hub 11 or they could at least be placed partly or entirely inside the hub 11.

Figure 8:
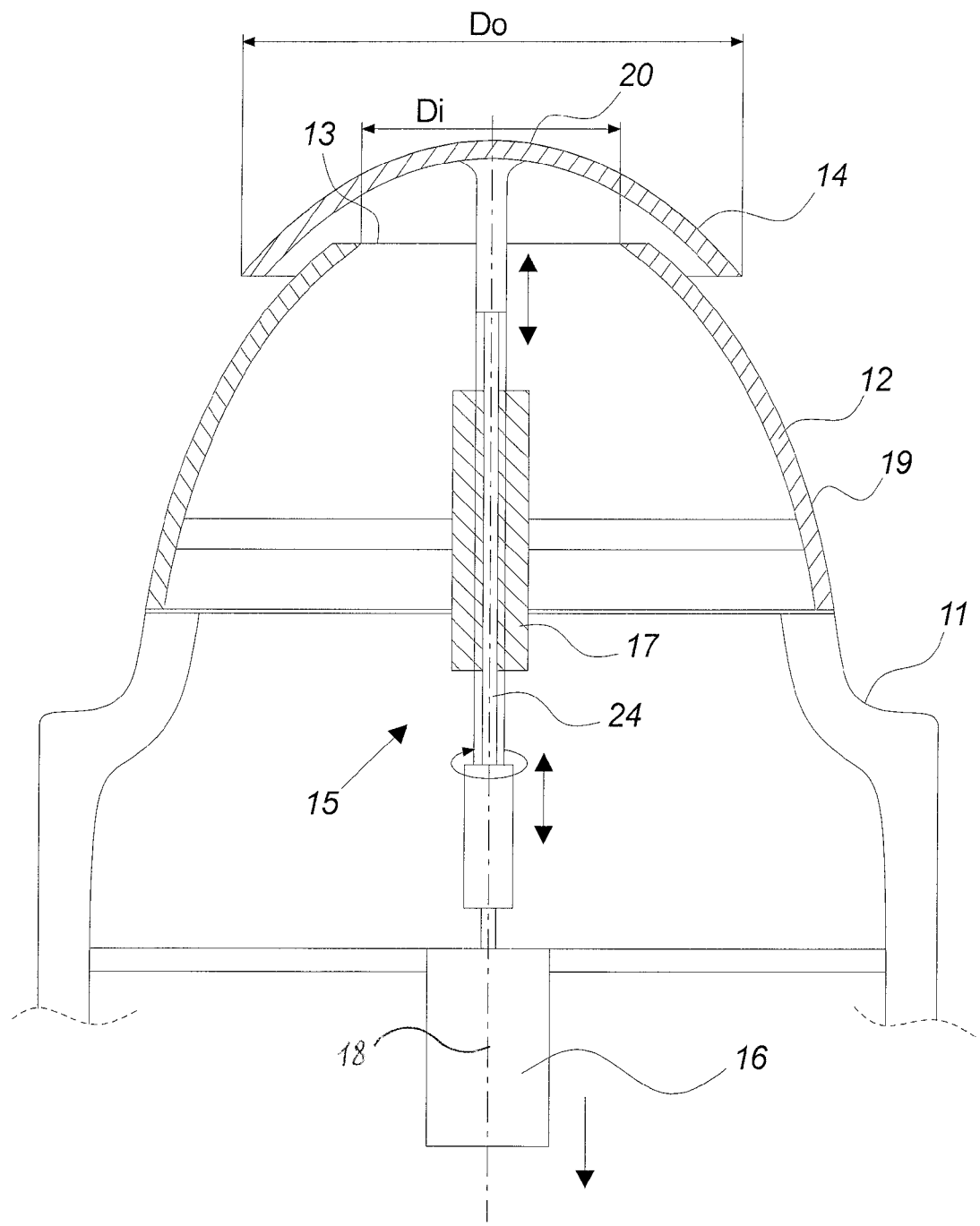
FIG. 8 illustrates a cross section of a spinner mounted on a wind turbine hub, as seen from the top.

FIG. 8 illustrates a cross section of a spinner 12 mounted on a wind turbine hub 11, as seen from the top.

In this embodiment of the invention the spinner 12 is also provided with only one aperture 13 at the tip 20 of the spinner 12, making the aperture cover 14 form the tip 20 of the spinner 12 but here the aperture cover 14 is made with an outer diameter Do which is bigger than the inner diameter Di of the aperture 13 in the spinner 14 making the cover form an overlap zone along the entire rim of the aperture 13 in the spinner 12. The cover 14 hereby overlaps the spinner 12 making air, drawn from the outside into the inside of the spinner 12, run substantially in the opposite direction of the wind direction of the surrounding air at least along a small part of the outside surface of the spinner 12. This sudden change of direction for the sucked in air will enable that some or all of unwanted foreign objects such as rain drops, bugs, sand and other are hurled out of the sucked in air and continuous along the outside surface of the spinner 12.

In this embodiment of the invention the spinner 12 and hub 11 is provided with aperture adjustment means 15 comprising moving means 16 in the form of a motor driven spindle 24. The aperture adjustment means 15 further comprises guiding means 17 in the form of a protracted spindle guide rigidly connected to the inside walls of the spinner 12. The spindle guide comprises internal thread corresponding to the outside thread of the spindle 24 making the spindle 24 move back and forth in relation to the spinner 12, when rotated by the motor which in this embodiment is rigidly connected to the inside of the hub 11.

In this embodiment the motor shaft is connected to the spindle 24 via a six-spline socket and shaft enabling that rotation can be transferred from the motor shaft to the spindle 24 even though the motor is fixed and the spindle moves in its longitudinal direction along the rotors axis of rotation 18.

In another embodiment the cover 14 could also be displaced by means of a linear actuator or the spindle 24 could be manually operated by means of a crank handle either on the end of the spindle 24 or at the outer edge on the outside surface of the cover 14—enabling that the cover 14 could be opened from the outside—or a combination of both.

On certain types of wind turbines 1 it could be advantageous to combine apertures 13 in the side 19 of the spinner 12 with an aperture 13 in the tip of the spinner 12. This could e.g. be the case if the spinner 12 is so small, that it is not possible to make the apertures 13 in the sides 19 of the spinner 12 big enough to allow a person to pass or at least to comply with legislation or requirements regarding emergency exits from confined spaces or other. An aperture 13 in the tip 20 of the spinner 12 could then be used as an emergency exits from the hub 11 and spinner 12 whereas one or more apertures on the side 19 of the spinner could be used for air intake.

In another embodiment of the invention the spinner 12, aperture adjustment means 15 or other could be combined with hoisting means for hoisting goods, personnel or other in or out of the spinner 12 or the spinner 12, the aperture adjustment means 15 or other could at least be prepared for such hoisting means which then only would be mounted at specific occasionally e.g. in relation with maintenance or other. The hoisting means could e.g. be a complete lifting apparatus or it could merely be one or more pulleys guiding a hoisting wire from a lifting apparatus such as a winch located further back in the hub 11 or in the nacelle 3.

The invention has been exemplified above with reference to specific examples of spinners 12, apertures 13, aperture covers 14 and other. However, it should be understood that the invention is not limited to the particular examples described above but may be designed and altered in a multitude of varieties within the scope of the invention as specified in the claims.

What is claimed is:

1. A wind turbine comprising a rotor, said rotor including a hub from which a number of wind turbine blades extend, and a spinner mounted on said hub, wherein said spinner comprises one or more apertures, wherein said wind turbine comprises one or more aperture covers for entirely or partly covering one or more of said apertures in said spinner and wherein said wind turbine further comprises one or more aperture adjusters for adjusting an effective size of one or more of said apertures by movement of one or more of said aperture covers.

2. The wind turbine according to claim 1, wherein said one or more aperture adjusters comprises one or more actuators for adjusting the position of said one or more aperture covers in relation to said spinner to adjust the effective size of said one or more apertures.

3. The wind turbine according to claim 2, wherein said one or more actuators for adjusting the position of said one or more aperture covers is manually operated.

4. The wind turbine according to claim 2, wherein said one or more actuators for adjusting the position of said one or more aperture covers comprises one or more linear actuators or one or more actuators based on a rack-and-pinion or motor driven spindle principle.

5. The wind turbine according to claim 2, wherein said one or more actuators is operable from an exterior of at least one of the spinner and the hub.

6. The wind turbine according to claim 2, wherein said aperture adjuster comprises a guide for guiding said aperture covers at least during said movement of said aperture covers.

7. The wind turbine according to claim 6, wherein said guide comprises means for linear displacement of said aperture covers.

8. The wind turbine according to claim 6, wherein said guide comprises means for guiding said aperture covers along an inside or an outside surface of sides of said spinner.

9. The wind turbine according to claim 6, wherein said guide comprises at least one helix for transforming rotation of said guide into linear displacement of said aperture covers.

10. The wind turbine according to claim 1, wherein said one or more apertures are located substantially on sides of said spinner.

11. The wind turbine according to claim 1, wherein a number of apertures in said spinner corresponds with a number of blades of said rotor.

12. The wind turbine according to claim 11, wherein said apertures are evenly spaced around said spinner and wherein said apertures are located between said blades in relation to a rotational plane of said rotor.

13. The wind turbine according to claim 1, wherein said aperture covers are interconnected or formed as one single part.

14. The wind turbine according to claim 1, wherein an effective size of all of said apertures are adjusted equally when said aperture adjuster displaces said aperture cover.

15. The wind turbine according to claim 1, wherein said aperture covers comprises cover apertures substantially corresponding to said apertures in said spinner.

16. The wind turbine according to claim 1, wherein said aperture adjuster comprises means for rotating said aperture covers in a plane substantially perpendicular to an axis of rotation of said spinner.

17. The wind turbine according to claim 1, wherein said one or more apertures are located in a tip of said spinner.

18. The wind turbine according to claim 1, wherein said aperture adjuster comprises means for displacing said aperture covers substantially along the axis of rotation of said rotor.

19. The wind turbine according to claim 1, wherein said one or more apertures in said spinner are circular.

20. The wind turbine according to claim 1, wherein said aperture cover has an outer diameter and wherein said outer diameter is bigger than an inner diameter of said aperture in said spinner.

21. The wind turbine according to claim 1, wherein at least one of said one or more apertures in said spinner is a through-going aperture allowing passage for at least one of personnel and goods from the interior of said spinner to the exterior of said spinner and vice versa.

22. Use of a wind turbine according to claim 1 wherein said wind turbine is a Megawatt wind turbine.

23. A method for establishing at least one aperture in a spinner on a hub of a wind turbine rotor, said aperture being established by displacing an aperture cover for partly or entirely covering said aperture, wherein said aperture cover is displaced by mechanical force.

24. The method according to claim 23, wherein a position of said aperture cover is adjusted in relation to said spinner to adjust the effective size of said aperture.

25. The method according to claim 23, wherein said aperture cover can be displaced from the exterior of said spinner or wherein an actuator for displacing said aperture cover is operable from the exterior of the spinner.

26. The method according to claim 23, wherein said aperture cover is guided by a guide at least during said displacement of said aperture covers.

27. The method according to claim 23, wherein said aperture cover is displaced linearly.

28. The method according to claim 23, wherein said aperture cover is displaced by being rotated substantially around an axis of rotation of said spinner.

29. The method according to claim 23, wherein said at least one aperture is provided in a side of said spinner.

30. The method according to claim 23, wherein said at least one aperture is provided in a tip of said spinner.

31. The method according to claim 23, wherein said spinner comprises at least two apertures and wherein an effective size of all of said apertures are adjusted equally when at least one aperture cover is displaced.

32. The method according to claim 23, wherein said aperture cover is guided along an inside or an outside surface of sides of said spinner.

33. The method according to claim 23, wherein said at least one aperture is an emergency exit of said wind turbine.

34. The method according to claim 23 wherein said wind turbine is a Megawatt wind turbine.

* * * * *

UNITED STATES PATENT AND TRADEMARK OFFICE
CERTIFICATE OF CORRECTION

PATENT NO. : 8,021,121 B2
APPLICATION NO. : 12/539982
DATED : September 20, 2011
INVENTOR(S) : Per Sveigaard Mikkelsen et al.

It is certified that error appears in the above-identified patent and that said Letters Patent is hereby corrected as shown below:

In the Specification:

At column 1, line approx. 33, "turbines gets bigger", should read --turbines get bigger--.

At column 2, line 1, "These load are", should read --These loads are--.

At column 2, line approx. 21, "would be need", should read --would be needed--.

At column 2, line approx. 57, "hydraulically system", should read --hydraulic system--.

At column 4, line 4, "are highly reduced", should read --is highly reduced--.

At column 4, line approx. 25, "covers comprises", should read --covers comprise--.

At column 4, line approx. 49, "aperture do not", should read --aperture does not--.

At column 4, line approx. 56, "tip if the spinner", should read --tip of the spinner--.

At column 4, lines approx. 61-62, "central and symmetrically position" should read --central and symmetrical position--.

At column 5, line 1, "and to provided either" should read --and provided either--.

At column 5, lines 3-4, "comprises a helix", should read --comprise a helix--.

At column 7, line 1, "Nacelles 3 exists", should read --Nacelles 3 exist--.

At column 7, line 3, "always comprise one", should read --always comprises one--.

At column 7, lines approx. 32-33, "is off cause", should read --is of course--.

At column 7, line approx. 50, "oval or a the", should read --oval or the--.

Signed and Sealed this
Twenty-seventh Day of March, 2012

David J. Kappos
*Director of the United States Patent and Trademark Office*

At column 8, line approx. 62, "could engaged and disengaged", should read --could engage and disengage--.

At column 8, lines approx. 63-64, "automatically or semi-automatically", should read --automatic or semi-automatic--.

At column 9, line 24, "are highly reduced", should read --is highly reduced--.

At column 10, lines approx. 32-33, "spinner 12 and hub 11 is" should read --spinner 12 and hub 11 are--.

At column 10, line approx. 60, "emergency exits from", should read --emergency exit from--.

In the Claims:

At column 11, claim 10, line 54, "apertures are", should read --aperture is--.

At column 12, claim 14, line 2, "are adjusted", should read --is adjusted--.

At column 12, claim 15, line 5, "covers comprises", should read --covers comprise--.

At column 12, claim 17, line 12, "apertures are", should read --aperture is--.

At column 12, claim 19, line 18, "apertures in . . . are circular", should read --aperture in . . . is circular--.

At column 12, claim 31, line 55, "are adjusted", should, read --is adjusted--.